US010228677B2

(12) United States Patent
Ando

(10) Patent No.: US 10,228,677 B2
(45) Date of Patent: Mar. 12, 2019

(54) VIBRATION INFORMATION DISPLAY DEVICE FOR MACHINE TOOL THAT ACQUIRES INFORMATION ONLY DURING TIME THAT VIBRATION VALUE AND RATE OF CHANGE EXCEED RESPECTIVE THRESHOLD

(71) Applicant: Okuma Corporation, Niwa-Gun (JP)

(72) Inventor: Tomoharu Ando, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 169 days.

(21) Appl. No.: 15/097,533

(22) Filed: Apr. 13, 2016

(65) Prior Publication Data

US 2016/0346891 A1 Dec. 1, 2016

(30) Foreign Application Priority Data

May 29, 2015 (JP) .................................. 2015-110351

(51) Int. Cl.
*G06F 19/00* (2018.01)
*G05B 19/404* (2006.01)

(52) U.S. Cl.
CPC .. *G05B 19/404* (2013.01); *G05B 2219/37081* (2013.01); *G05B 2219/41256* (2013.01); *Y02P 90/265* (2015.11)

(58) Field of Classification Search
CPC ................................................. G05B 19/4069
(Continued)

(56) References Cited

U.S. PATENT DOCUMENTS 6,085,121 A * 7/2000 Stern ...................... B23Q 17/12
340/680
8,010,302 B2 8/2011 Okita et al.
(Continued)

FOREIGN PATENT DOCUMENTS

CN 101180157 A 5/2008
CN 101310921 A 11/2008
(Continued)

OTHER PUBLICATIONS

Japanese Office Action (and translation provided by foreign counsel) from a corresponding Japanese patent application (JP 2015-110351) dated Dec. 18, 2018, 6 pages.
(Continued)

*Primary Examiner* — Suresh Suryawanshi
(74) *Attorney, Agent, or Firm* — Burr & Brown, PLLC

(57) ABSTRACT

A vibration information display device includes a monitor, a vibration information acquisition unit, an operating information acquisition unit, a storage unit, and a display control unit. The monitor displays information on the chatter vibrations. The vibration information acquisition unit acquires vibration information when the chatter vibrations are detected. The operating information acquisition unit acquires operating information of the machine tool when the chatter vibrations are detected. The storage unit stores the acquired vibration information and operating information. The display control unit displays the vibration information and the operating information stored in the storage unit on the monitor. Alternatively, the display control unit displays the vibration information stored in the storage unit on the monitor together with trajectory information of a blade edge of the tool included in the operating information.

5 Claims, 10 Drawing Sheets

(58) Field of Classification Search
USPC .......................................................... 700/184
See application file for complete search history.

(56) References Cited

U.S. PATENT DOCUMENTS

| | | | |
|---|---|---|---|
| 8,317,440 | B2 | 11/2012 | Roders |
| 8,700,201 | B2 | 4/2014 | Yoshino et al. |
| 9,186,765 | B2 | 11/2015 | Ando et al. |
| 9,483,042 | B2 | 11/2016 | Sato et al. |
| 9,588,512 | B2* | 3/2017 | Lee .................. G05B 19/404 |
| 9,682,455 | B2* | 6/2017 | Piner .................. G05B 19/404 |
| 2008/0289923 | A1* | 11/2008 | Suzuki ............... B23Q 17/0976 188/379 |
| 2009/0013790 | A1 | 1/2009 | Roders |
| 2010/0104388 | A1* | 4/2010 | Suzuki ............... B23Q 11/0039 409/131 |
| 2011/0015877 | A1 | 1/2011 | Okita et al. |
| 2011/0135415 | A1* | 6/2011 | Hamaguchi ........ B23Q 11/0032 409/79 |
| 2012/0065766 | A1 | 3/2012 | Yoshino et al. |
| 2012/0093598 | A1 | 4/2012 | Ando et al. |
| 2012/0093603 | A1 | 4/2012 | Ueno |
| 2013/0073251 | A1* | 3/2013 | Nishimura ......... G05B 19/4062 702/147 |
| 2014/0180467 | A1* | 6/2014 | Sato ..................... G05B 19/18 700/184 |
| 2014/0364991 | A1* | 12/2014 | Lee .................... G05B 19/404 700/160 |

FOREIGN PATENT DOCUMENTS

| | | |
|---|---|---|
| CN | 101957610 A | 1/2011 |
| CN | 102407490 A | 4/2012 |
| CN | 102452022 A | 5/2012 |
| JP | 10-328976 A1 | 12/1998 |
| JP | 11-151638 A | 6/1999 |
| JP | 2000-084798 A | 3/2000 |
| JP | 2009-115481 A1 | 5/2009 |
| JP | 2012-081562 A1 | 4/2012 |
| JP | 2012-88967 A | 5/2012 |
| JP | 2012-183596 A1 | 9/2012 |
| JP | 2014-126939 A | 7/2014 |

OTHER PUBLICATIONS

Chinese Office Action (and translation provided by foreign counsel) from a corresponding Chinese patent application (CN 201610364832.0) dated Oct. 8, 2018.

* cited by examiner

FIG. 5

| DATA 1 | DATE<br>TIME<br>PROGRAM NAME<br>EXECUTION CODE<br>COORDINATE OF BLADE EDGE OF TOOL<br>TOOL NUMBER<br>MAIN SPINDLE ROTATION SPEED $[\text{min}^{-1}]$<br>VIBRATION VALUE<br>... |
|---|---|
| DATA 2 | DATE<br>TIME<br>PROGRAM NAME<br>EXECUTION CODE<br>COORDINATE OF BLADE EDGE OF TOOL<br>TOOL NUMBER<br>MAIN SPINDLE ROTATION SPEED $[\text{min}^{-1}]$<br>VIBRATION VALUE<br>... |
| ⋮ | ⋮ |

VIBRATION INFORMATION DISPLAY DEVICE FOR MACHINE TOOL THAT ACQUIRES INFORMATION ONLY DURING TIME THAT VIBRATION VALUE AND RATE OF CHANGE EXCEED RESPECTIVE THRESHOLD

BACKGROUND

This application claims the benefit of Japanese Patent Application Number 2015-110351 filed on May 29, 2015 the entirety of which is incorporated by reference.

TECHNICAL FIELD

The disclosure relates to a vibration information display device to display information on chatter vibrations in a machine tool that performs processing while rotating the tool or workpiece. The chatter vibrations may cause deterioration of a processed surface and tool life.

RELATED ART

In machining, depending on a processing condition such as a main spindle rotation speed and a feed speed, chatter vibrations occur, which may possibly deteriorate a processed surface. The chatter vibrations damage a tool, also resulting in deterioration of tool life. The processing conditions of initial products are temporarily set based on the past performance. An operator confirms a state of the temporarily set processing to finally decide the processing conditions. However, to save the cost taken for preparation of production, in the case of processing that takes long processing time such as a molding, the operator may not attend on to confirm the processing. In the case of such unattended on operation of machine, the technique as disclosed in Japanese Unexamined Patent Application Publication No. 2012-183596 (JP 2012-183596 A) is employed to ensure restraining chatters generated by automatically changing a main spindle speed.

For example, Japanese Unexamined Patent Application Publication No. 2009-115481 (JP 2009-115481 A), Japanese Unexamined Patent Application Publication No. 10-328976 (JP 10-328976 A), and Japanese Unexamined Patent Application Publication No. 2012-81562 (JP2012-81562 A) have been known as techniques to record, analyze, and notify operating states such as vibrations generated during processing and presence/absence of an operation that automatically changes the main spindle speed as described above. JP 2009-115481 A discloses the plurality of vibration detection sensors, the monitor diagnostic device, and the alarm notification means. The vibration detection sensors are installed at a plurality of positions where vibrations occur by rotatably driving the rotary machine. The monitor diagnostic device is coupled to the vibration detection sensors. The alarm notification means is coupled to the monitor diagnostic device, and if the monitor diagnostic device diagnoses the state as abnormal, the alarm notification means outputs an alarm. An alarm value vibration level is sent to a manager through e-mail or is displayed as a message in an operation terminal screen, which configures the alarm notification means.

JP 10-328976 A discloses the following technique. The NC device is disposed near the machine tool or is disposed integrally with the machine tool. The NC device merges the operating information and time information of the machine tool as one log data set. The NC device records the log data set by one day as a log file for each day in the storage device. The NC device totalizes the log data set in the log file to record the totaled result as a performance information file in the storage device. The NC device displays the log file and the data of the performance information file on the display means. JP 10-328976 A discloses that the log data set includes the data such as date and time data, tool numbers, comments, rotation speeds of a main spindle, feed speeds, periods of use (for example, a period (second) from a tool exchange command until a next tool exchange command), cutting periods (for example, a period (second) during which a feed command such as G01, G02, and G03 is in execution), and fast-forward periods (for example, a period (second) during which a fast-forward command such as G00 is in execution).

JP2012-81562 A discloses the following operation history management device. The operation history management device stores a rotation speed of the rotation shaft and vibration acceleration in a frequency region as the operation history. Additionally, the operation history management device stores the operation history not only when the rotation speed of the rotation shaft changes but also the maximum value of the vibration acceleration in the frequency region exceeds a predetermined threshold. Since the operation history management device stores the change in the rotation speed of the rotation shaft associated with the state of chatter vibrations, an operator grasps the rotation speed of the rotation shaft associated with the state of chatter vibrations, which helps restrain the chatter vibrations effectively.

It has been also known that, using stored operation history, the well-known method described in for example, Non-Patent Literature 1, "2008, The Japan Society for Precision Engineering Spring Conference Academic Lecture Proceedings, 'Inverse identification of a transfer function with experimental results in end milling,' Nagoya University, Yusuke Kurata, Norikazu Suzuki, Eiji Shamoto" is employed to display the stability limit graph.

With the disclosure in JP 2009-115481 A, when the state is diagnosed as abnormal, the alarm is output to the alarm notification means. The vibration level at the time is sent to the manager through e-mail or is displayed on the operation terminal screen, which configures the alarm notification means. However, in the machine tool which moves the tool and the workpiece relatively for processing, it is required to clarify a location of an abnormality in the workpiece and correct the program. Therefore, different from rotary machine equipment, the machine tool also requires location information at which the abnormality occurs, resulting in insufficient information.

With the disclosure of JP 10-328976 A, the operating information by one day is recorded as the log file and the data in the file are displayed. However, information on a process abnormality needs to be extracted from various pieces of operating information, which takes time for analysis of the operating information. When the operator does not attend on the processing, it is unclear whether the chatter vibrations occurs or not until the operator views the operating information.

With the disclosure of JP2012-81562 A, countermeasures against chatter vibrations such as the stability limit graph are presented using the recorded operating information. However, similar to JP 10-328976 A, in the case where the operator does not attend on the processing, whether the chatter vibrations occur or not is unclear until the operator views the operating information.

Therefore, an object of the disclosure is to provide a vibration information display device for machine tool that instantly displays information on chatter vibrations on a monitor and promptly presents the information to the operator who is away from the machine to ensure notifying the process abnormality together with the operating information.

SUMMARY

In order to achieve the above-described object, a vibration information display device according to a first aspect of the disclosure is disposed in the machine tool that processes a workpiece while rotating a tool or workpiece. The machine tool has a vibration detection configured to detect chatter vibrations that occur during the processing. The vibration information display device includes a monitor that displays information on the chatter vibrations. Further, the vibration information display device includes a vibration information acquisition unit, an operating information acquisition unit, a storage unit, and a display control unit. The vibration information acquisition unit acquires vibration information when the chatter vibrations are detected. The operating information acquisition unit acquires operating information of the machine tool when the chatter vibrations are detected. The storage unit stores the acquired vibration information and operating information. The display control unit displays the vibration information and the operating information stored in the storage unit on the monitor. Alternatively, the display control unit displays the vibration information stored in the storage unit on the monitor together with trajectory information of a blade edge of the tool included in the operating information.

According to a second aspect of the disclosure, in the first aspect, the vibration information display device has a vibration-restraining function configured to ensure restraining the detected chatter vibrations. The display control unit displays the vibration information together with an accomplished state of the vibration-restraining function on the monitor.

According to a third aspect of the disclosure, in the second aspect, the vibration information display device includes an input unit to the monitor. When the input unit is operated, the display control unit displays a screen regarding countermeasures to restrain the chatter vibrations.

According to a fourth aspect of the disclosure, in the third aspect, to display the vibration information on the monitor together with the trajectory information of the blade edge of the tool, the display control unit displays a position of the chatter vibrations on a trajectory of the blade edge of the tool. When the position is selected with the input unit, the display control unit displays the screen regarding countermeasures to restrain the chatter vibrations at the selected position on the monitor. The display control unit ensures changing information required to create the screen with the input unit.

According to a fifth aspect of the disclosure, in the fourth aspect, the positions of the chatter vibrations on the trajectory of the blade edge of the tool are plurality selectable with the input unit. When a plurality of the positions are selected with the input unit, the monitor displays a screen regarding countermeasures to restrain the chatter vibrations at the selected all positions.

With the disclosure according to the first aspect, the monitor instantly displays the information on the chatter vibrations of machine tool together with the operating information. Accordingly, the process abnormality occurred during unattended operation can be promptly notified to the operator who has returned to the machine. In that case, the program in which the chatter vibrations have occurred, the blade edge position of the tool, or similar information can be grasped.

With the disclosure according to the second aspect, in addition to the effect of the first aspect, whether the machine has automatically performed an operation to restrain the chatter vibrations or not can also be grasped.

With the disclosure according to the third aspect, in addition to the effect of the second aspect, by the input operation, the screen regarding countermeasures to restrain the chatter vibrations is displayed. Accordingly, information on the countermeasures against vibrations is easily grasped, and the immediate handling is ensured. Therefore, processing is quickly optimized.

With the disclosure according to the fourth aspect, in addition to the effect of the third aspect, the operator can set the information required to create the screen immediately. Therefore, the operator quickly refers to the countermeasures without advance preparations.

With the disclosure according to the fifth aspect, in addition to the effect of the fourth aspect, the operator can find the countermeasures considering all causes of the chatter vibrations occurred due to different causes depending on the mechanical property and the change in processing state.

BRIEF DESCRIPTION OF THE DRAWINGS

FIG. 5 is an explanatory view of acquired operating information and vibration information.

DETAILED DESCRIPTION

The following describes embodiments of the disclosure based on the drawings.

Figure 1:
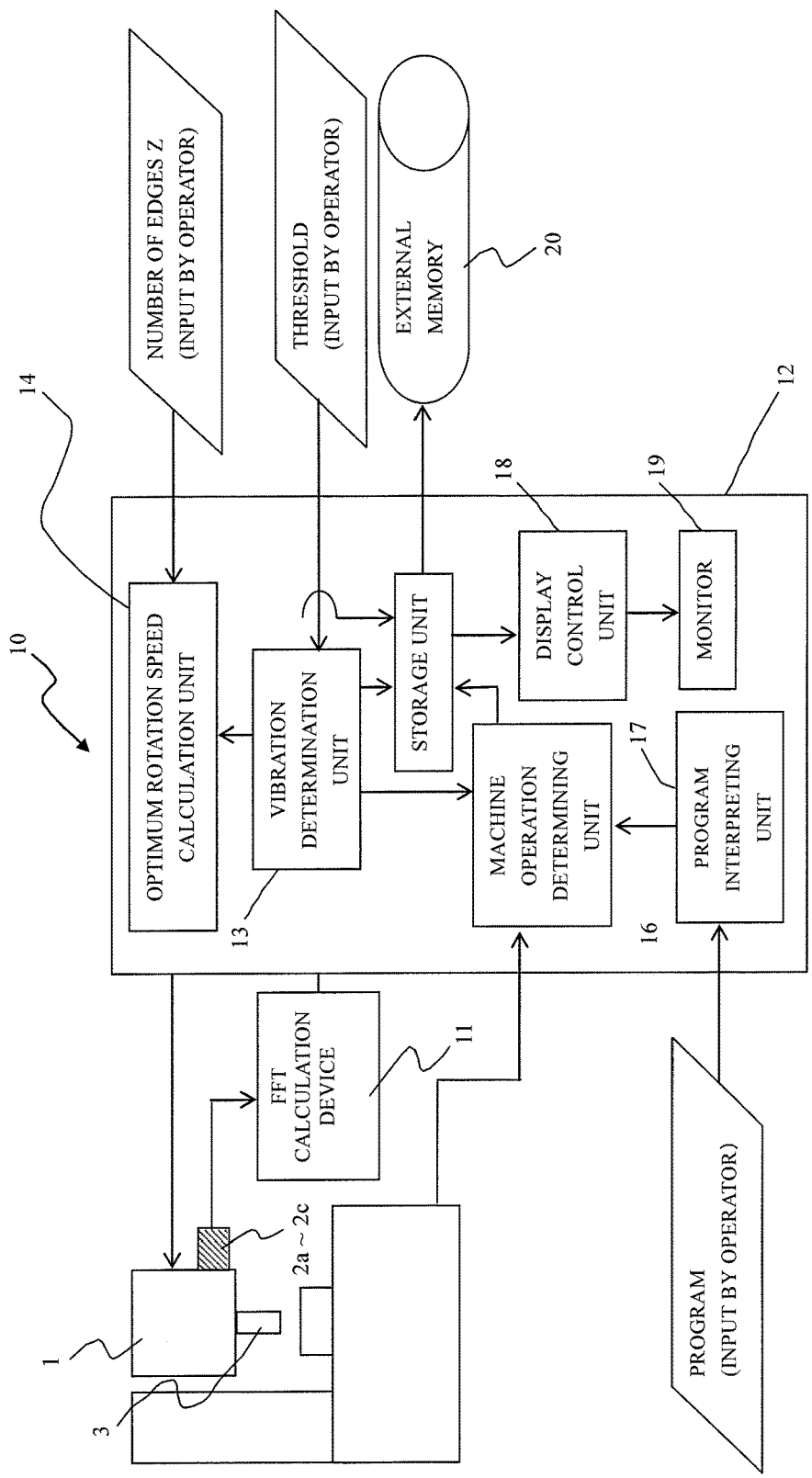
FIG. 1 is a block configuration diagram of a vibration information display device.
Figure 2:
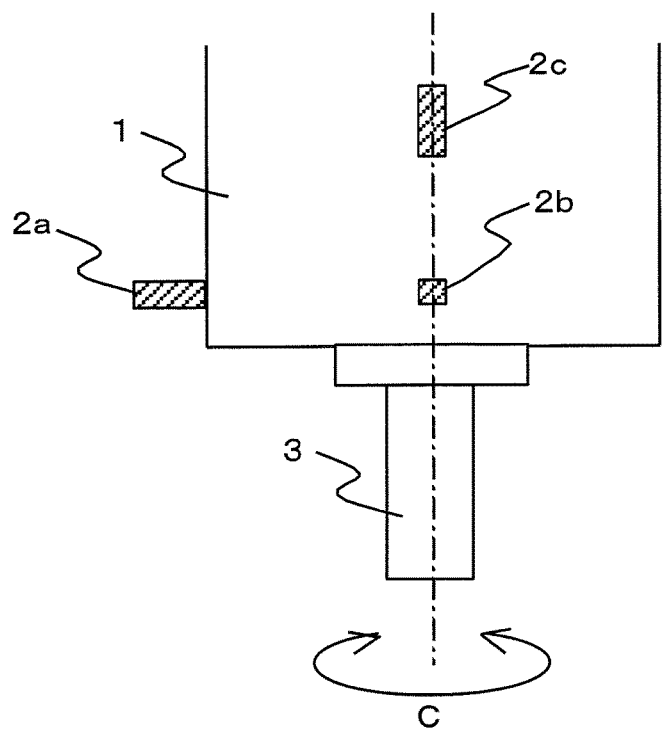
FIG. 2 is a side view of a main spindle housing.
Figure 3:
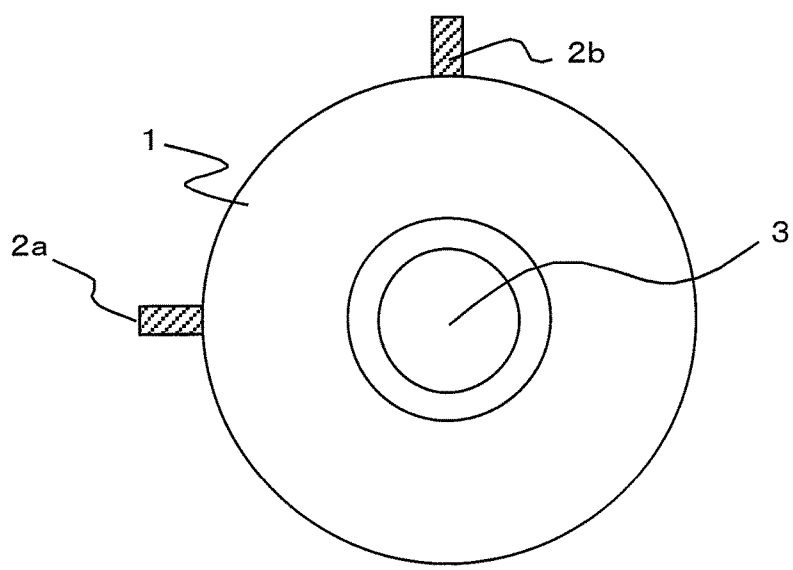
FIG. 3 is a front view (a bottom view) of the main spindle housing.

FIG. 1 is a block configuration diagram illustrating an example of a vibration information display device for machine tool. FIG. 2 is a side view of a main spindle housing of the machine tool. FIG. 3 is a front view of the main spindle housing (a drawing illustrating the main spindle housing from a lower side in an axial direction).

Reference numeral 1 denotes a main spindle housing that includes a main spindle 3 in a machine tool. The main spindle housing 1 rotates a tool held to the main spindle 3 to process workpiece placed on a table disposed below. The main spindle housing 1 includes vibration sensors 2a to 2c, which are acceleration sensors. The vibration sensors 2a to $2c$ are used as means to detect vibrations (vibrations on a time axis) in a time domain generated in the main spindle 3, which is rotatably disposed around a C axis. To detect vibration information in a direction orthogonal to one another, the vibration sensors $2a$ to $2c$ are mounted to the main spindle housing 1 in a state where the vibration information in the time domain in X-axis, Y-axis, and Z-axis directions, which are mutually orthogonal, is detectable.

A vibration information display device 10 includes an FFT calculation device 11 and an NC device 12. The FFT calculation device 11 performs a Fourier analysis based on vibration acceleration, which is detected by the vibration sensors $2a$ to $2c$.

The NC device 12 includes a vibration determination unit 13 as vibration information acquisition means. The vibration determination unit 13 compares a vibration value (a maximum acceleration) on which the Fourier analysis has been performed by the FFT calculation device 11 and a threshold set by an operator to determine whether chatter vibrations occur or not. When the vibration determination unit 13 determines that the vibration value is over the threshold and a rate of change of vibration exceeds the set value, the vibration frequency is transmitted to an optimum rotation speed calculation unit 14. The optimum rotation speed calculation unit 14 calculates a main spindle rotation speed optimum to restrain the chatter vibrations using the well-known technique as disclosed in JP 2012-183596 A and automatically changes the main spindle rotation speed. The calculation of the optimum rotation speed requires a number of edges Z of the tool. The operator preliminary inputs the number of edges Z.

When the vibration value is over the threshold and the rate of change of vibration exceeds the set value, the vibration determination unit 13 causes a storage unit 15, which is as storage means, to store the vibration value. Additionally, the vibration determination unit 13 instructs a machine operation determining unit 16 as operating information acquisition means to transmit the operating information of the machine to the storage unit 15. Here, the operating information of the machine includes time, a program name, an execution code of a program, a blade edge position, a tool number, a main spindle rotation speed, a feed speed, a workpiece origin, a tool length, a machine coordinate, or similar information. The machine operation determining unit 16 acquires the program name and the execution code from a program interpreting unit 17 to which the program is input by the operator. The machine operation determining unit 16 monitors a detector or a similar device disposed at the machine tool to acquire the main spindle rotation speed, the feed speed, trajectory information of the blade edge of the tool, or similar information.

Thus, the storage unit 15 stores the operating information together with the vibration value. Then, a display control unit 18, which is as display control means, causes a monitor 19 to display the information as the vibration information. The monitor 19 is equipped with the NC device 12 as a standard to display an NC program, a current position of the machine, or similar information. The vibration information is also recorded in an external memory 20. The display control unit 18 also ensures displaying the vibration information with the trajectory of the blade edge of the tool on the monitor 19. When the operator issues a request, the display control unit 18 also ensures displaying the result of the optimum speed, which is calculated by the optimum rotation speed calculation unit 14, using the vibration information.

Figure 4:
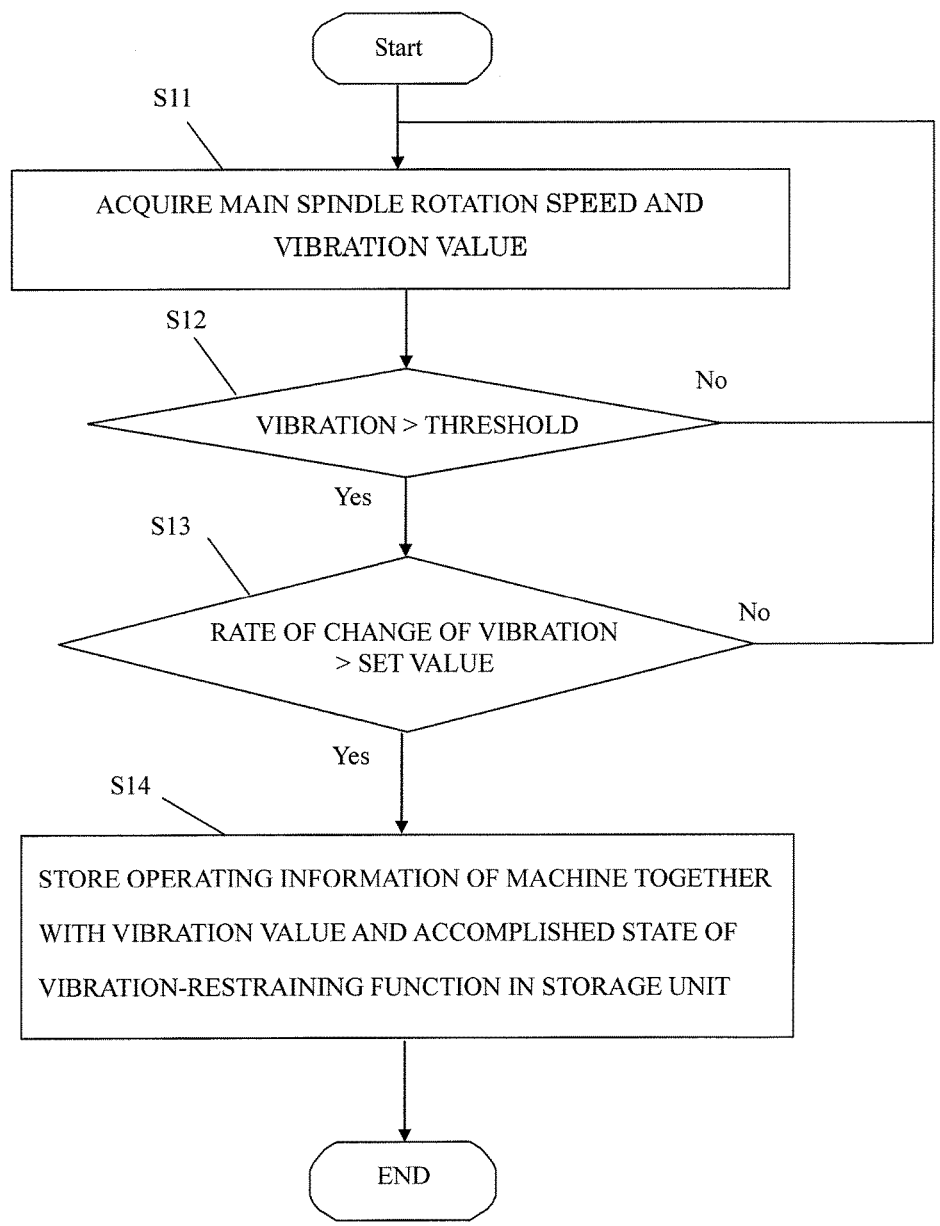
FIG. 4 is a flowchart for an acquisition control of operating information, vibration information, or similar information.

The following describes a procedure up to displaying the vibration information on the monitor 19 in the vibration information display device 10, which is configured as described above, with reference to the flowchart in FIG. 4.

First, the machine operation determining unit 16 acquires a current main spindle rotation speed, and the FFT calculation device 11 acquires a current vibration value (S11). Next, the vibration determination unit 13 compares a threshold preset by the operator and the vibrations acquired by the FFT calculation device 11 (S12). When the detected vibration is smaller than the threshold, the step returns to S11. When the detected vibration is larger than the threshold at S12, a rate of change of vibration per preset unit time is monitored. That is, the machine operation determining unit 16 determines whether the rate of change of vibration exceeds the preset value or not. If the rate of change of vibration does not exceed the preset value, the machine operation determining unit 16 waits for the excess by the rate of change of vibration (S13). When the rate of change of vibration exceeds the set value, the vibration value at the time point and an accomplished state of a vibration-restraining function (presence/absence of change to the optimum rotation speed by the optimum rotation speed calculation unit 14 and a result when changed to the optimum rotation speed) are added to the operating information of the machine, and the storage unit 15 records the operating information (S14).

Figure 6:
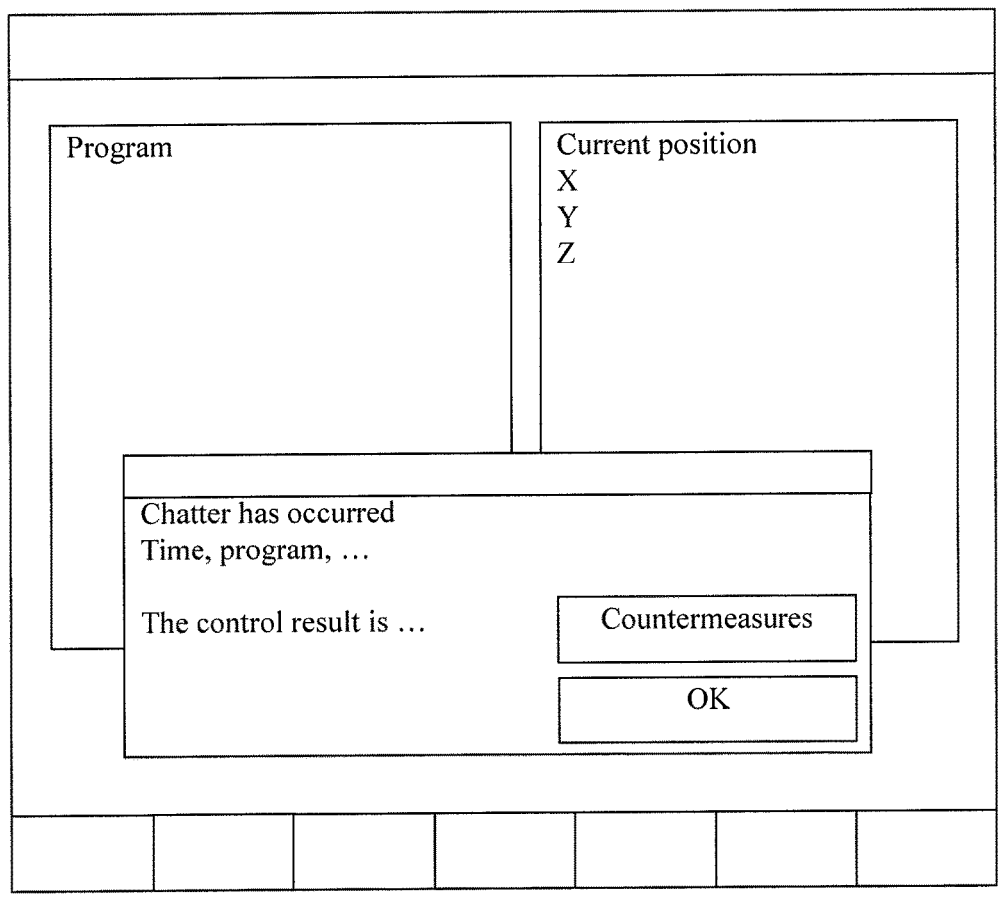
FIG. 6 is an explanatory view of a display screen on a monitor.

As a result, a recorded data set as illustrated in FIG. 5 is created. One recorded data set includes the time, the program name, the execution code of the program, the tool blade edge position, the tool number, the main spindle rotation speed, the vibration value, or similar data. As illustrated in FIG. 6, by the creation of this data, the display control unit 18 creates a new window on a frontmost on the screen of the monitor 19 to display data contents. This window remains to be displayed until an "OK" button is pressed (even if the machine is powered off and then is power-on again) on the monitor 19, which is a touch panel (input means).

Figure 8:
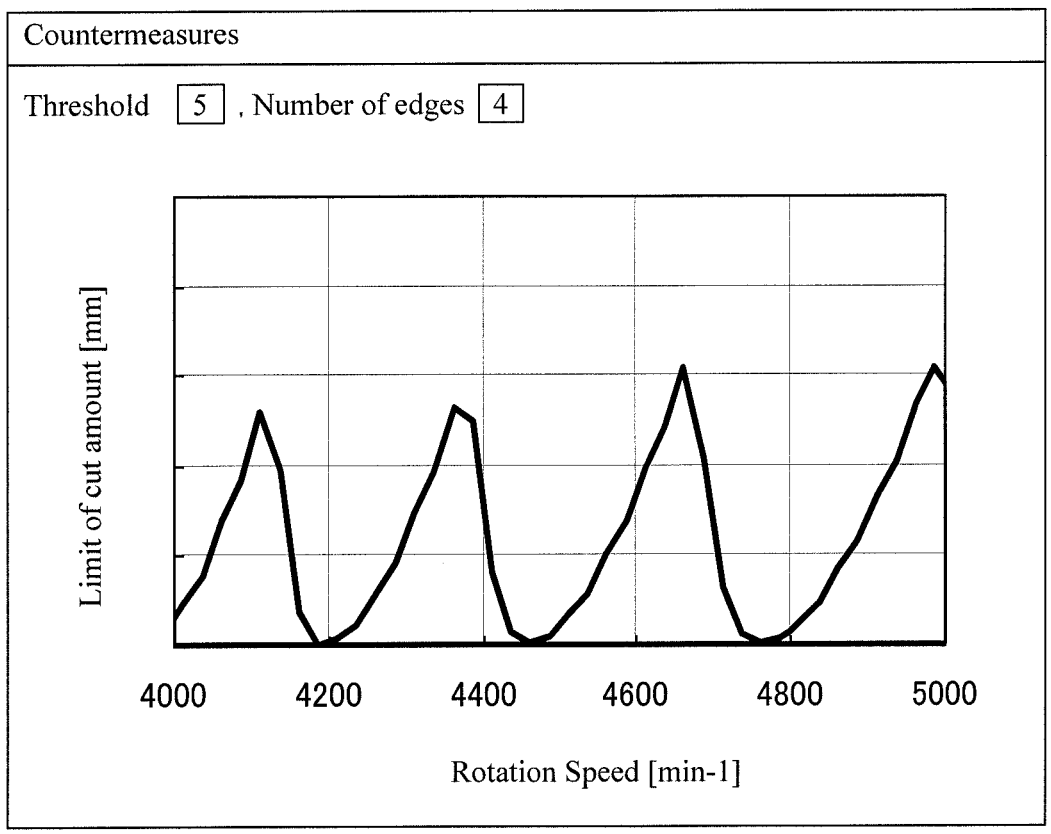
FIG. 8 is an explanatory view of the monitor display screen that displays a stability limit graph.

Here, by pressing a "Countermeasures" button, the display control unit 18 creates and displays a stability limit graph, which is illustrated in FIG. 8, as a screen regarding countermeasures to restrain the chatter vibrations using the technique as disclosed in, for example, the Non-patent Literature 1 mentioned above (discloses the method of performing inverse identification from the chatter vibration frequency to identify the modal parameter). At this time, setting items for information required to create the stability limit graph such as the number of edges can be set in this screen. This ensures displaying the stability limit graph without presetting the respective items. Accordingly, the operator can recognize whether a stability margin is large at the current rotation speed or not. This allows the operator to easily know countermeasures effective to restrain the chatter vibrations (whether the rotation speed should be changed to any of the high-rotation side where the stability margin is large or the low-rotation side).

Figure 7:
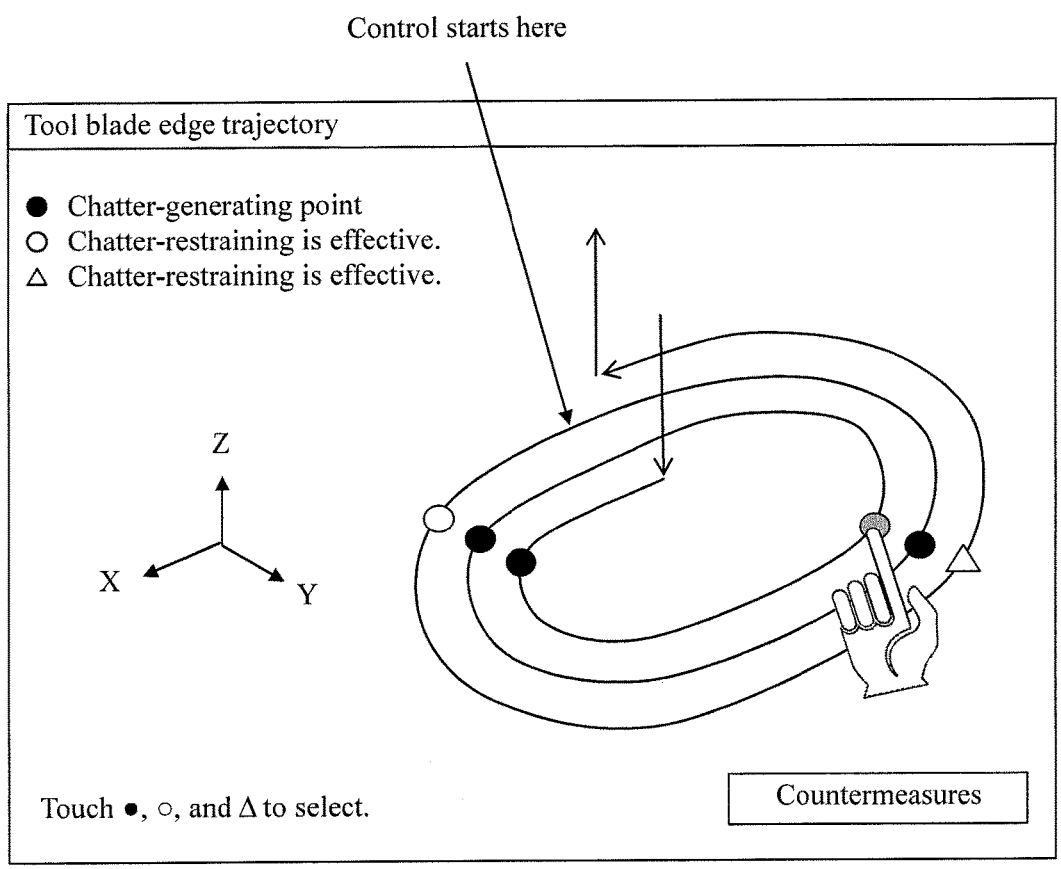
FIG. 7 is an explanatory view of the display screen on the monitor for a blade edge trajectory with chatter information.

Meanwhile, instead of the display illustrated in FIG. 6, as illustrated in FIG. 7, the monitor 19 may display the trajectory of the blade edge of the tool with which recorded data set is associated. Here, the presence/absence of chatter and presence/absence of an operation to restrain the chatter are identified with symbols and are disposed on the trajectory. Therefore, when the operator selects each symbol and presses the "Countermeasures" button, which is input means, the stability limit graph for the selected processed site is displayed as illustrated in FIG. 8. This allows the operator to similarly know the countermeasures effective to restrain the chatter vibrations.

Figure 9:
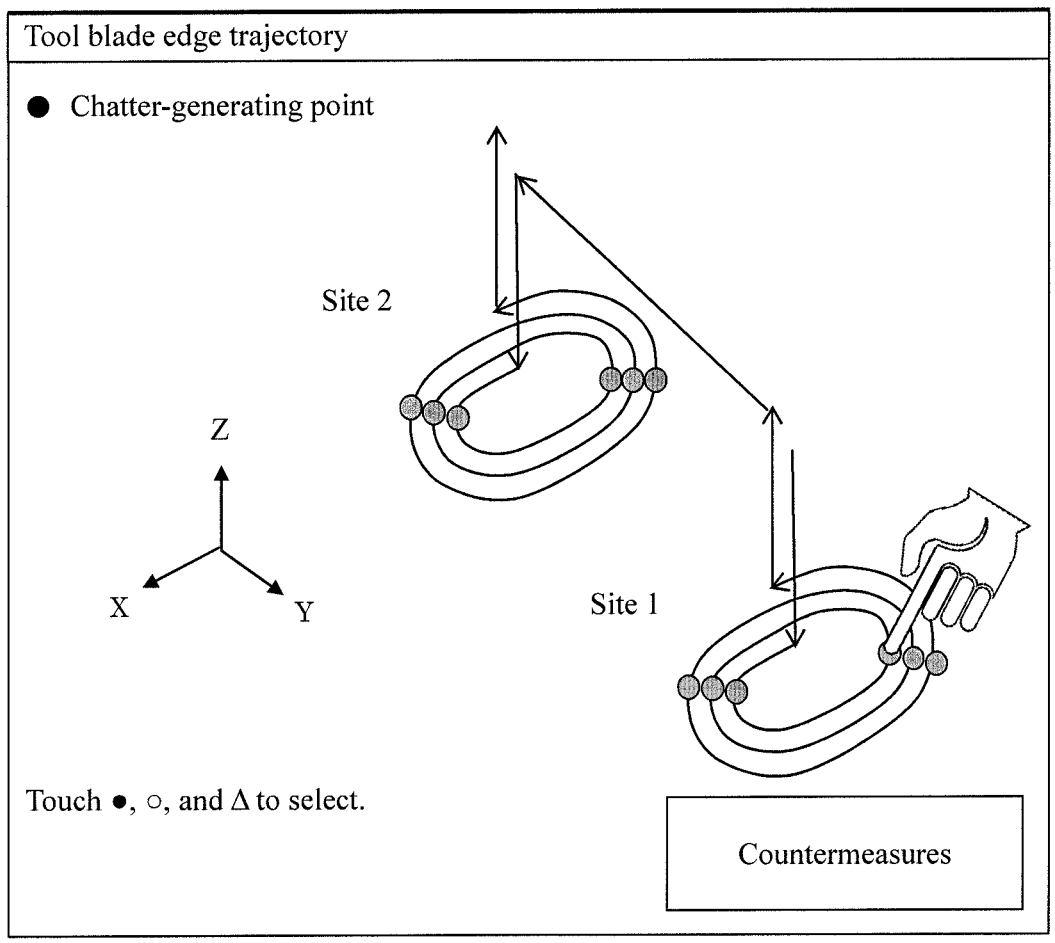
FIG. 9 is an explanatory view of a modification example of the display screen of the monitor for the blade edge trajectory with the chatter information.
Figure 10:
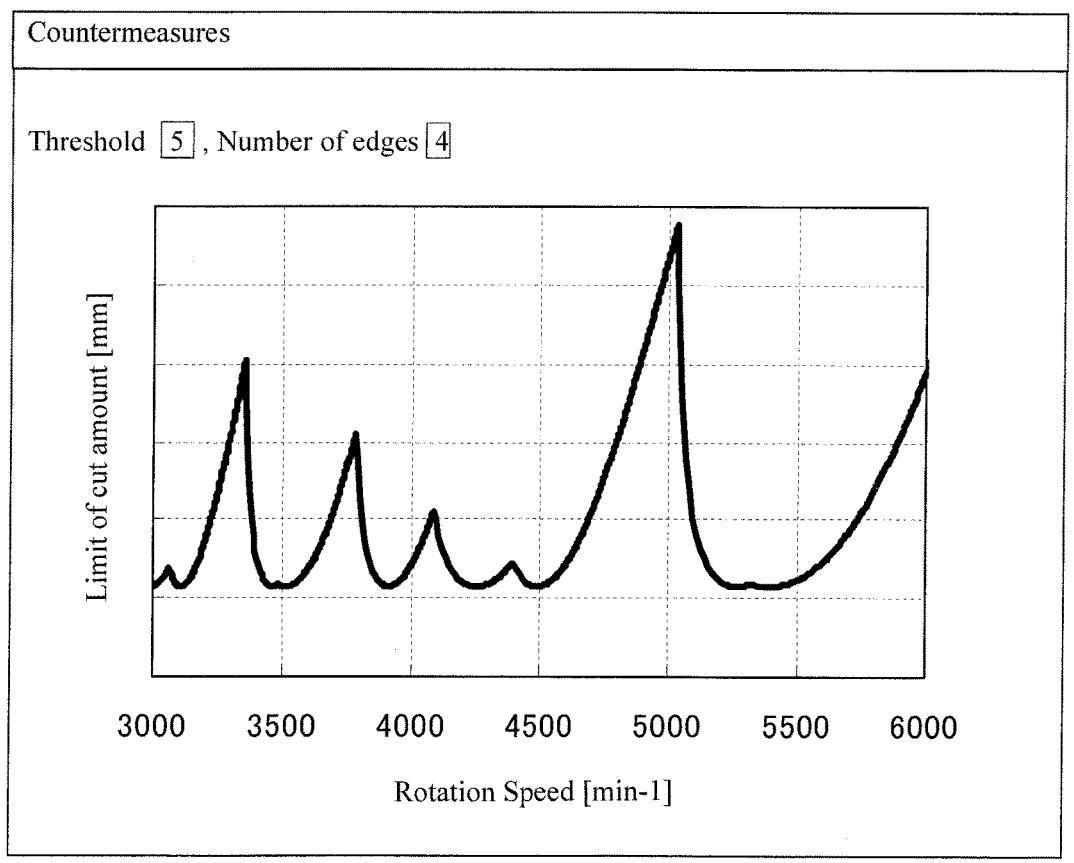
FIG. 10 is an explanatory view of a modification example of the monitor display screen that displays the stability limit graph.

However, in the case where there are two processed sites at remote locations, a display example of the trajectory of the blade edge of tool is as illustrated in FIG. 9. Here, the chatter vibrations occur at the site 1 and the site 2. However, since the processing locations differ, the mechanical property changes, and therefore, stability limit graphs may be different between the site 1 and the site 2. However, due to a reason such as processing with an identical tool, there may be a case where the processing conditions are desired to be identical between both. Accordingly, here, the countermeasures are displayed comprehensively by all the selected points to display the stability limit graph illustrated in FIG. 10, which is more complicated than the stability limit graph in FIG. 8, that adds the countermeasures against the respective chatter vibrations at the sites 1 and 2.

Thus, the vibration information display device 10 according to the embodiment includes the vibration determination unit 13, the machine operation determining unit 16, the storage unit 15, and the display control unit 18. The vibration determination unit 13 is configured to acquire the vibration information when the chatter vibrations are detected. The machine operation determining unit 16 acquires the operating information of the machine tool when the chatter vibrations are detected. The storage unit 15 stores the acquired vibration information and operating information. The display control unit 18 displays the vibration information and the operating information stored in the storage unit 15 together with the accomplished state of the vibration-restraining function on the monitor 19. Alternatively, the display control unit 18 displays the vibration information stored in the storage unit 15 on the monitor 19 together with the accomplished state of the vibration-restraining function and the trajectory information of the blade edge of the tool included in the operating information. This ensures instantly displaying the information on chatter vibrations of the machine tool together with the operating information on the monitor 19. Accordingly, the process abnormality occurred during unattended operation can be promptly notified to the operator who has returned to the machine. In that case, whether the machine has automatically performed an operation to restrain the chatter vibrations or not, the program in which the chatter vibration has occurred, the blade edge position of the tool, or similar information can be grasped.

Especially, here, by a touch operation on the "Countermeasures" button on the monitor 19, the display control unit 18 displays the stability limit graph regarding the countermeasures to restrain the chatter vibrations. Accordingly, information on the countermeasures against vibrations is easily grasped, and the immediate handling is ensured. Therefore, processing is quickly optimized.

To display the vibration information on the monitor 19 together with the accomplished state of the vibration-restraining function and the trajectory information of the blade edge of the tool, the display control unit 18 displays the position of the chatter vibrations on the trajectory of the blade edge of the tool. When a selection operation is performed on the position, the display control unit 18 displays the stability limit graph regarding countermeasures to restrain the chatter vibrations at the selected position on the monitor 19. The display control unit 18 changes information required to create the stability limit graph such as the number of edges on the monitor 19. Accordingly, the operator can set the information required to create the stability limit graph immediately. Therefore, the operator quickly refers to the countermeasures without advance preparations.

Furthermore, the positions of the chatter vibrations on the trajectory of the blade edge of the tool are plurality selectable on the monitor 19. When a selection operation is performed on a plurality of the positions, the monitor 19 displays the stability limit graph regarding countermeasures to restrain the chatter vibrations at the selected all positions. Therefore, the operator can find the countermeasures considering all causes of the chatter vibrations occurred due to different causes depending on the mechanical property and the change in processing state.

The embodiment employs the vibration sensors as means to detect vibrations. However, a microphone, a position/rotation detector, and a current of a main spindle/feed axis motor can also be used. Although, the embodiment determines the chatter vibrations by the comparison with both the threshold of vibrations and the set value of the rate of change of vibration, the chatter vibrations may be compared only with the threshold. Even with a machine tool without the vibration-restraining function, displaying the vibration information, the operating information, and the trajectory information on the blade edge of the tool ensures prompt notification of process abnormality.

Furthermore, the operating information acquisition means may be configured as follows. In addition to the machine operation determining unit inside the NC device, for example, the operating information is output to an external arithmetic unit over a network coupled to the external memory and the NC device. Then, the processing state is analyzed, and the analysis result is transmitted to the NC device over the network.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A vibration information display device for a machine tool in which a tool or workpiece is rotated to process the workpiece, the vibration information display device being disposed in the machine tool having a vibration detection configured to detect chatter vibrations occurring during processing, the vibration information display device comprising:
    a monitor configured to display information on the chatter vibrations;
    a vibration information acquisition unit configured to acquire vibration information only during time that a vibration value exceeds a vibration threshold and a rate of change of vibration exceeds a set value;
    an operating information acquisition unit configured to acquire operating information of the machine tool only during time that said vibration value exceeds said vibration threshold and said rate of change of vibration exceeds said set value;
    a storage unit storing vibration values acquired during time that said vibration value exceeds said vibration threshold and said rate of change of vibration exceeds said set value, and said storage unit storing operating information acquired during time that said vibration value exceeds said vibration threshold and said rate of change of vibration exceeds said set value; and a display control unit configured to display on the monitor vibration information acquired during time that said vibration value exceeds said vibration threshold and said rate of change of vibration exceeds said set value, and operating information acquired during time that said vibration value exceeds said vibration threshold and said rate of change of vibration exceeds said set value, alternatively, the display control unit being configured to display on the monitor vibration information acquired during time that said vibration value exceeds said vibration threshold and said rate of change of vibration exceeds said set value together with trajectory information of a blade edge of the tool included in operating information acquired during time that said vibration value exceeds said vibration threshold and said rate of change of vibration exceeds said set value.

2. The vibration information display device for machine tool according to claim 1, wherein the vibration information display device further comprises:

a vibration-restraining function configured to ensure restraining detected chatter vibrations, wherein the display control unit is configured to display the vibration information acquired during time that said vibration value exceeds said vibration threshold and said rate of change of vibration exceeds said set value, together with an accomplished state of the vibration-restraining function on the monitor.

3. The vibration information display device for machine tool according to claim 2, wherein the vibration information display device further comprises:

an input unit to the monitor, wherein when the input unit is operated, the display control unit is configured to display a screen regarding countermeasures to restrain chatter vibrations.

4. The vibration information display device for machine tool according to claim 3, wherein to display the vibration information on the monitor together with the trajectory information of the blade edge of the tool, the display control unit is configured to display a position of chatter vibrations on a trajectory of the blade edge of the tool, and when the position is selected with the input unit, [1] the display control unit is configured to display the screen regarding countermeasures to restrain the chatter vibrations at the selected position on the monitor, and [2] the display control unit is configured to ensure changing information required to create the screen with the input unit.

5. The vibration information display device for machine tool according to claim 4, wherein the positions of the chatter vibrations on the trajectory of the blade edge of the tool are configured to be selectable in plural with the input unit, and when a plurality of the positions are selected with the input unit, the monitor is configured to display a screen regarding countermeasures to restrain the chatter vibrations at each of the selected positions.

* * * * *